United States Patent [19]
Gholz

[11] Patent Number: 6,079,362
[45] Date of Patent: Jun. 27, 2000

[54] STOCK WATERING TANK WITH A PHOTOVOLTAIC DE-ICER

[76] Inventor: Abigail R. Gholz, 40788 Red Hill Rd., Leesburg, Va. 20175

[21] Appl. No.: 09/321,719

[22] Filed: May 28, 1999

[51] Int. Cl.[7] .................................................. A01K 7/00
[52] U.S. Cl. .................................................. 119/73
[58] Field of Search .............................. 119/61, 69.5, 72, 119/73, 74, 75

[56] References Cited

U.S. PATENT DOCUMENTS

| | | |
|---|---|---|
| 4,108,156 | 8/1978 | Sitter . |
| 4,162,684 | 7/1979 | Loveless, Jr. . |
| 4,320,720 | 3/1982 | Streed . |
| 4,662,354 | 5/1987 | Stoy et al. . |
| 4,930,572 | 6/1990 | Doshier . |
| 5,156,113 | 10/1992 | Sextro . |

*Primary Examiner*—Thomas Price
*Attorney, Agent, or Firm*—Oblon, Spivak, McClelland, Maier & Neustadt, P.C.

[57] ABSTRACT

A stock watering tank including a container 10 which, in use, contains water for stock, a photovoltaic cell 20, an electrically powered heater 16 located in the container 10, and a battery 26 connected to the photovoltaic cell 20 so that electrical energy produced by the photovoltaic cell 20 is stored in the battery 26 and connected to the electrically powered heater 16 so that electrical energy from the battery 26 powers the electrically powered heater 16.

4 Claims, 1 Drawing Sheet

STOCK WATERING TANK WITH A PHOTOVOLTAIC DE-ICER

FIELD OF THE INVENTION

The invention relates to stock watering tanks such as are used on horse farms, cattle ranches, etc.

BACKGROUND OF THE INVENTION

During cold weather the water in stock watering tanks can ice over or freeze solid. During such conditions, the stock can suffer or even die from thirst. To prevent or minimize that, those responsible for the stock either have to visit the stock watering tank and break the ice or provide de-icers. However, many stock watering tanks are in locations where it is inconvenient or expensive to connect de-icers to the power grid or to provide a conventional (e.g., diesel-powered) electricity generator.

OBJECT OF THE INVENTION

It is the principal object of the invention to provide a stock watering tank which will be automatically maintained ice free at least part of the time by a photovoltaic generator during temperature conditions when the stock watering tank would otherwise be covered by ice or even frozen solid.

DETAILED DESCRIPTION OF THE PRESENTLY PREFERRED EMBODIMENTS

Figure 1:
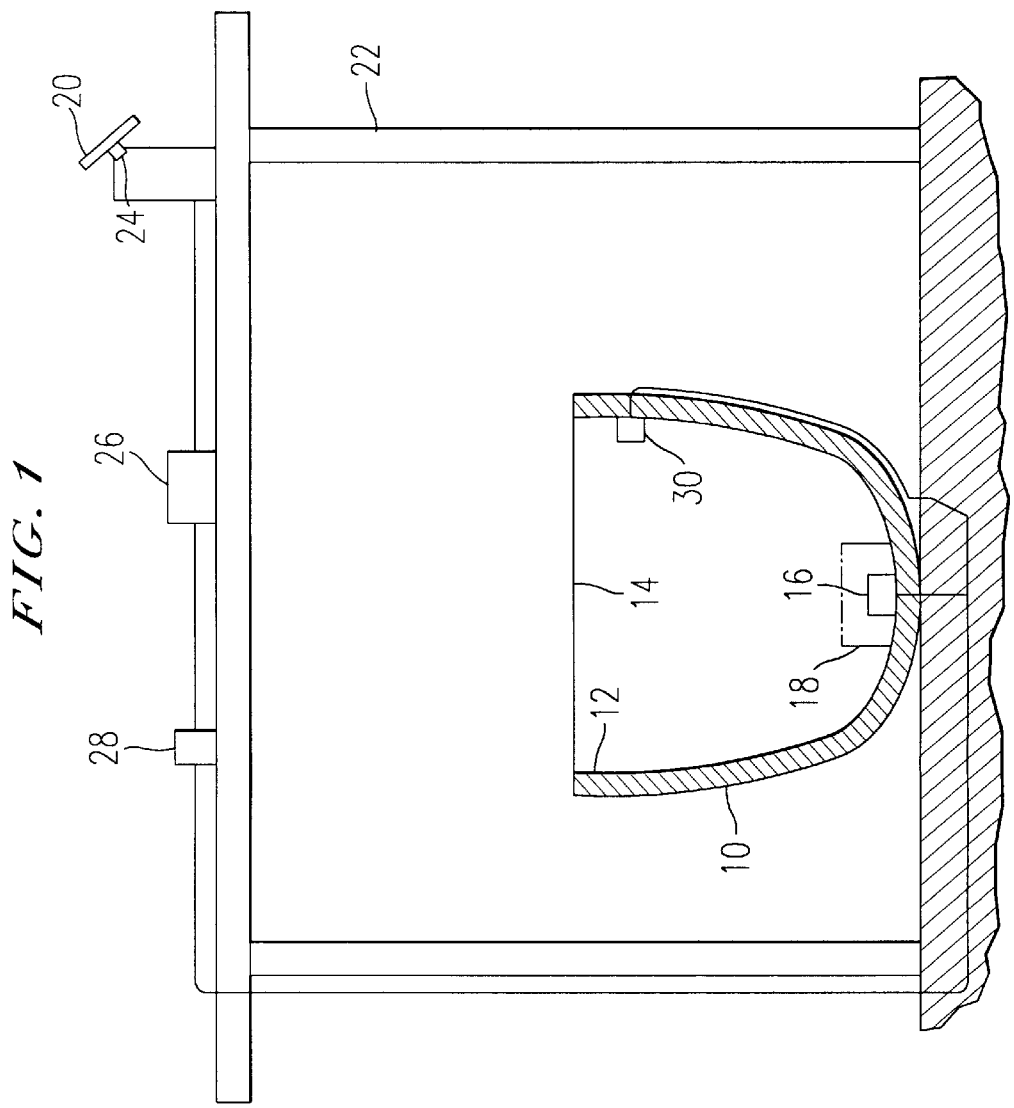
FIG. 1 is a highly schematic illustration of both of the presently preferred embodiments.

Throughout this application, the term "stock" is used generically to include, inter alia, cattle, horses, sheep, ostriches, etc.—basically, any animals that drink water and that are raised by human beings.

The term stock watering tank is used to mean any container for water for stock. Conventionally, they are metal, plastic, or ceramic tanks that sit on the ground or are mounted on the ground, but conceivably they could be naturally occurring ponds or declivities in rock formations. All that is necessary for purposes of this invention is that they be capable of containing water in use and that they afford access by the stock to the water.

FIG. 1 shows a stock watering tank in the form of a container 10 which, in use, contains water for stock. The container 10 is preferably insulated, and the inner surface 12 of the container 10 is preferably black to act as a passive solar energy gatherer. The top 14 of the container 10 is open to afford access by the stock to the water.

Located in the container 10 (preferably on the bottom of the inner surface 12 of the container 10) is an electrically powered heater 16. The electrically powered heater 16 is preferably surrounded by a removable mesh 18 which prevents the stock from coming into contact with the electrically powered heater 16 while permitting the water heated by the electrically powered heater 16 to circulate through the interior of the container 10.

Adjacent to the container 10 is a photovoltaic cell 20. The photovoltaic cell 20 may, for instance, be mounted on top of a run-in shed 22 that provides shade for the stock while they are drinking from the container 10. The photovoltaic cell 20 is oriented toward the sun. Preferably, the photovoltaic cell 20 is mounted on a biaxial pivot mechanism 24 which causes the photovoltaic cell 20 (1) to pivot from east to west to track the sun during each day and (2) to pivot relative to the vertical to compensate for the height to which the sun rises during each season.

Adjacent both the container 10 and the photovoltaic cell 20 is a battery 26 which collects and stores electrical power generated by the photovoltaic cell 20. The battery 26 may also be mounted on top of the run-in shed 22. The battery 26 (1) is connected to the photovoltaic cell 20 so that the electrical energy produced by the photovoltaic 20 is stored in the battery 26 and (2) to the electrically powered heater 16 so that the electrical energy from the battery 26 powers the electrically powered heater 16.

The circuit containing the photovoltaic cell 20, the battery 26, and the electrically powered heater 16 also contains a control mechanism. Two specific types of control mechanism are currently envisioned. These two different types of control mechanisms may be used in combination or as alternatives.

First, the control mechanism may be a timer 28 connected to the battery 26 and the electrically powered heater 16 so that the electrically powered heater 16 is turned on only at certain times—e.g., during daylight hours or starting a predetermined time before the stock are expected at the stock watering tank. The timer 28 may likewise be mounted on top of the run-in shed 22.

Second, the control mechanism may be a temperature sensor 30 located in the container 10 and connected to the battery 26 and to the electrically powered heater 16 so that the electrically powered heater 16 is turned on only when the temperature in the container 10 drops below a certain temperature. That temperature may, for a example, be a temperature a few degrees above the freezing temperature of water, since it requires more energy to melt ice than it does to prevent ice from forming.

Obviously, numerous modifications and variations of the present invention are possible in light of the above teachings. It is therefore to be understood that, within the scope of the appended claims, the invention may be practiced otherwise than as specifically described herein.

I claim:

1. A stock watering tank with a photovoltaic de-icer, said stock watering tank comprising:
   (a) a container which, in use, contains water for stock;
   (b) a photovoltaic cell;
   (c) an electrically powered heater located in said container; and
   (d) a battery:
      (i) connected to said photovoltaic cell so that electrical energy produced by said photovoltaic cell is stored in said battery and
      (ii) connected to said electrically powered heater so that electrical energy from said battery powers said electrically powered heater.

2. A stock watering tank as recited in claim 1 and further comprising a temperature sensor located in said container and connected to said battery and to said electrically powered heater so that said electrically powered heater is turned only on when the temperature in said container drops below a certain temperature.

3. A stock watering tank with a photovoltaic de-icer, said stock watering tank comprising:
   (a) a container which, in use, contains water for stock;

(b) a photovoltaic cell;
(c) an electrically powered heater located in said container;
(d) a battery;
   (i) connected to said photovoltaic cell so that electrical energy produced by said photovoltaic cell is stored in said battery and
   (ii) connected to said electrically powered heater so that electrical energy from said battery powers said electrically powered heater; and
(e) a timer connected to said battery and to said electrically powered heater so that said electrically powered heater is turned on only at certain times.

4. A stock watering tank as recited in claim 3 and further comprising a temperature sensor located in said container and connected to said battery and to said electrically powered heater so that said electrically powered heater is turned on only when the temperature in said container drops below a certain temperature.

* * * * *